United States Patent
Ambroladze et al.

(10) Patent No.: US 8,392,621 B2
(45) Date of Patent: Mar. 5, 2013

(54) MANAGING DATAFLOW IN A TEMPORARY MEMORY

(75) Inventors: Ekaterina M. Ambroladze, Wappingers Falls, NY (US); Deanna Postles Dunn Berger, Poughkeepsie, NY (US); Michael Fee, Cold Spring, NY (US); Arthur J. O'Neill, Jr., Poughkeepsie, NY (US); Diana Lynn Orf, Somerville, MA (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 12/820,589

(22) Filed: Jun. 22, 2010

(65) Prior Publication Data

US 2011/0314183 A1    Dec. 22, 2011

(51) Int. Cl.
*G06F 3/00* (2006.01)
(52) U.S. Cl. ............ 710/5; 710/6; 710/7; 710/8; 710/18; 710/22; 710/20; 710/29; 710/30; 710/33
(58) Field of Classification Search .................. 710/5, 6, 710/7, 8, 18, 19, 20, 29, 30, 33
See application file for complete search history.

(56) References Cited

U.S. PATENT DOCUMENTS

| | | | |
|---|---|---|---|
| 6,823,406 B2 * | 11/2004 | Yoda et al. ..................... | 710/52 |
| 7,213,095 B2 | 5/2007 | Middleton et al. | |
| 7,418,540 B2 * | 8/2008 | Rohit et al. ..................... | 711/5 |
| 2007/0245036 A1 * | 10/2007 | Fekih-Romdhane ............. | 710/5 |
| 2008/0065799 A1 | 3/2008 | Heynemann et al. | |
| 2010/0011145 A1 | 1/2010 | Carver et al. | |
| 2010/0125687 A1 * | 5/2010 | Kusachi et al. ................. | 710/39 |

OTHER PUBLICATIONS

Carretero, Javier et al. "End-to-End Register Data-Flow Continuous Self-Test," International Symposium on Computer Architecture, Austin, Texas, Jun. 20-24, 2009, pp. 105-115.

* cited by examiner

*Primary Examiner* — Chun_Kuan Lee
*Assistant Examiner* — Jasjit Vidwan
(74) *Attorney, Agent, or Firm* — Cantor Colburn LLP; John Campbell (57) ABSTRACT

A method of managing a temporary memory includes: receiving a request to transfer data from a source location to a destination location, the data transfer request associated with an operation to be performed, the operation selected from an input into an intermediate temporary memory and an output; checking a two-state indicator associated with the temporary memory, the two-state indicator having a first state indicating that an immediately preceding operation on the temporary memory was an input to the temporary memory and a second state indicating that the immediately preceding operation was an output from the temporary memory; and performing the operation responsive to one of: the operation being an input operation and the two-state indicator being in the second state, indicating that the immediately preceding operation was an output; and the operation being an output operation and the two-state indicator being in the first state, indicating that the immediately preceding operation was an input.

20 Claims, 7 Drawing Sheets

MANAGING DATAFLOW IN A TEMPORARY MEMORY

BACKGROUND

Exemplary embodiments relate generally to data transfer operations, and particularly to systems and methods for ensuring correct dataflow.

In computing, many systems such as data processing and storage systems utilize temporary memories to facilitate various operations. For example, many systems utilize dataflow buffers to temporarily hold data that is being transferred between two locations, such as between caches or other regions of memory, processors and servers. As systems such as cache management systems become more complex, data flow is often separated from control functions.

In order to maintain data integrity, systems generally require a considerable number of control buses between control macros and dataflow buffers. The buffer controls rely on sequence information from control macros. Processing and/or hardware errors can cause buffer controls to read or write improper data, which can result in loss of data and compromised system integrity.

Other error checking techniques include splitting a dataflow within a cache or other memory into separate synchronously operated data stacks having independent controls, and error checking by verifying that the stacks operated synchronously. In other designs, the data stacks are consolidated into a single stack with one set of controls, however this combination eliminates the ability to error check by comparing two independent controls.

BRIEF SUMMARY

An exemplary embodiment includes a method of managing a temporary memory. The method includes: receiving a request to transfer data from a source location to a destination location, the data transfer associated with an operation to be performed, the operation selected from an input into an intermediate temporary memory and an output from the temporary memory; checking a two-state indicator associated with the temporary memory, the two-state indicator having a first state indicating that an immediately preceding operation on the temporary memory was an input to the temporary memory and a second state indicating that the immediately preceding operation was an output from the temporary memory; and performing the operation responsive to one of: the operation being an input operation and the two-state indicator being in the second state, indicating that the immediately preceding operation was an output; and the operation being an output operation and the two-state indicator being in the first state, indicating that the immediately preceding operation was an input.

Another exemplary embodiment includes a device for managing a temporary memory. The device includes: a temporary memory for inputting data received from a source location and outputting data to a destination location; a controller functionally coupled to the temporary memory, the controller being responsive to computer-executable instructions and configured to perform: receiving a request to transfer data from a source location to a destination location, the data transfer request associated with an operation to be performed, the operation selected from an input into the temporary memory and an output from the temporary memory; checking a two-state indicator associated with the temporary memory, the two-state indicator having a first state indicating that an immediately preceding operation on the temporary memory was an input to the temporary memory and a second state indicating that the immediately preceding operation was an output from the temporary memory; and performing the operation responsive to one of: the operation being an input operation and the two-state indicator being in the second state, indicating that the immediately preceding operation was an output; and the operation being an output operation and the two-state indicator being in the first state, indicating that the immediately preceding operation was an input.

A further exemplary embodiment includes a computer program product for managing a temporary memory. The computer program product includes a tangible storage medium readable by a processing circuit and storing instructions for execution by the processing circuit for performing a method including: receiving a request to transfer data from a source location to a destination location, the data transfer request associated with an operation to be performed, the operation selected from an input into an intermediate temporary memory and an output from the temporary memory; checking a two-state indicator associated with the temporary memory, the two-state indicator having a first state indicating that an immediately preceding operation on the temporary memory was an input to the temporary memory and a second state indicating that the immediately preceding operation was an output from the temporary memory; and performing the operation responsive to one of: the operation being an input operation and the two-state indicator being in the second state, indicating that the immediately preceding operation was an output; and the operation being an output operation and the two-state indicator being in the first state, indicating that the immediately preceding operation was an input.

Additional features and details are realized through the techniques of the present invention. Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

The systems and methods described herein provide a simple mechanism for certifying that dataflow buffers, registers or other temporary memory devices in a storage and/or processing system have been correctly used and contain proper data. A controller, such as a buffer controller or cache controller, is configured to perform a check to ensure that the order of operations in a buffer are being upheld. The check includes utilizing a two-state indicator and/or setting the two-state indicator to make sure that the dataflow buffer has not been compromised, and to certify that the order of operations (e.g., read/write operations) is being upheld in the buffer or warn the system if the dataflow buffer is set on an incorrect sequence. In one embodiment, the controller is configured to, in response to a read request or output operation to be performed (or request to otherwise transfer data), check the two-state indicator and block the input request and/or warn the system if the buffer has not been written (or data has not otherwise been inputted into the buffer) since the last read or output. The controller may also check the two-state indicator in response to a write request or input operation to be performed (or a request to otherwise transfer data), and block the output request and/or warn the system, if the data in the buffer that was written or input in an immediately preceding operation has not been read out or outputted. The controller may also be configured to warn the system and/or force a correction if an incorrect sequence has occurred. These checks are simple and inexpensive ways to certify that the order of operations is being upheld in the buffer, and have a minimal impact on timing and size of associated processing/memory units.

In one embodiment, the system includes an error checking mechanism that identifies the source of dataflows received in a destination processor and/or memory location. A source indication or tag is generated from the dataflow to identify the sent data, and a second tag or destination tag is received from the destination to identify the received data, and the first and second tags are compared to ensure that the correct data was received.

Figure 1:
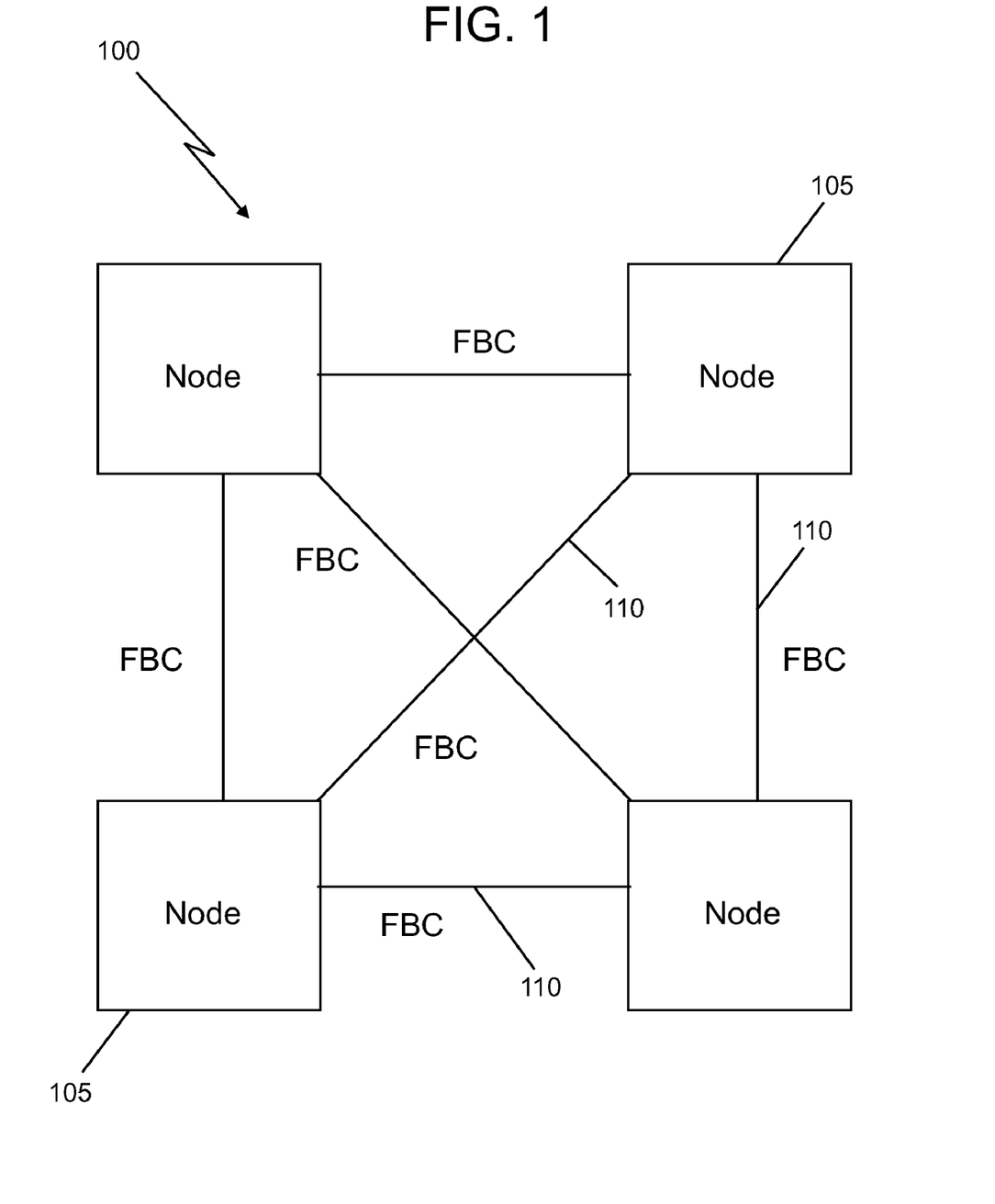
FIG. 1 depicts an exemplary embodiment of a computing, processing and/or data management network.

FIG. 1 illustrates an exemplary embodiment of a computing, processing and/or data management system 100 such as a storage area network. The system 100 includes multiple nodes 105 connected in communication with one another via suitable connectors 110 such as wires, cables and optical fibers. The nodes 105 may be any processing and/or storage system such as a computer, server, data center, cache system or mainframe computer. The connectors 110 may include any of various connectors, ports, switches and other devices, and with the nodes 105 form a network or fabric. In the embodiment shown in FIG. 1, the connectors 110 are configured as fabric connectors (FBC).

Figure 2:
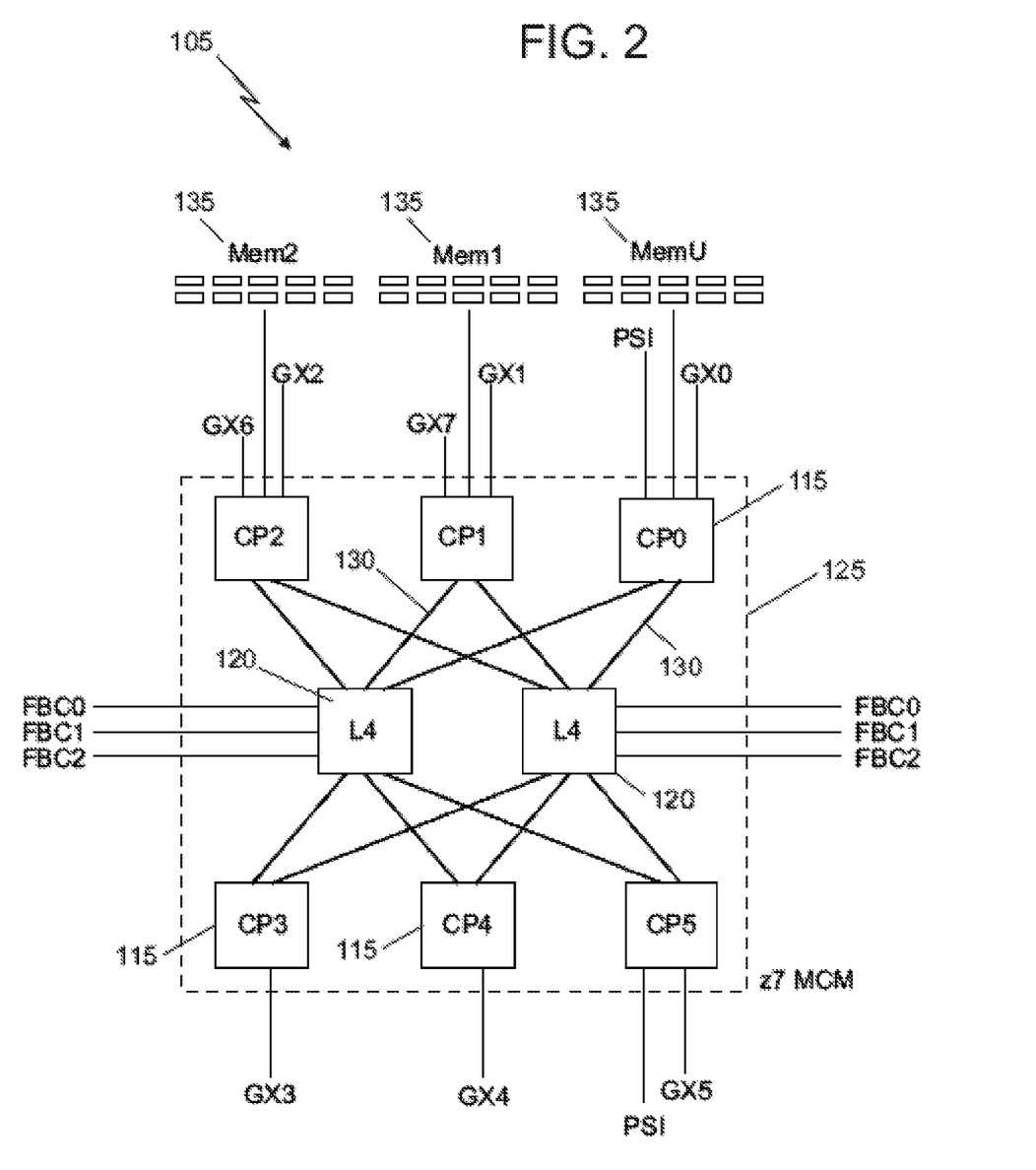
FIG. 2 depicts a data storage system in accordance with exemplary embodiments.

FIG. 2 illustrates an exemplary data storage system having a cache topology that may form all or part of a node 105. A plurality of central processors (CP) 115 (also referred to as central processing units) are operatively connected via busses to one or more level 4 (L4) caches 120. In one embodiment, the CPs 115 and the L4 caches 120 are integrated in a package such as a multi-chip module (MCM) 125 and connected via conductors 130. In one example, the MCM 125 is a component of a data center, mainframe, server or other data storage device. In this embodiment, the MCM 125 may be connected to memory devices 135 such as disk drives or tape drives. The MCM 125 may also be connected in communication with other nodes 105 via fabric connectors, channels and/or other connectors 110. The central processors and caches are not limited to the embodiments described herein, and may be any type of processing and/or storage component such as a microprocessor, memory area and/or logical entity.

Figure 3:
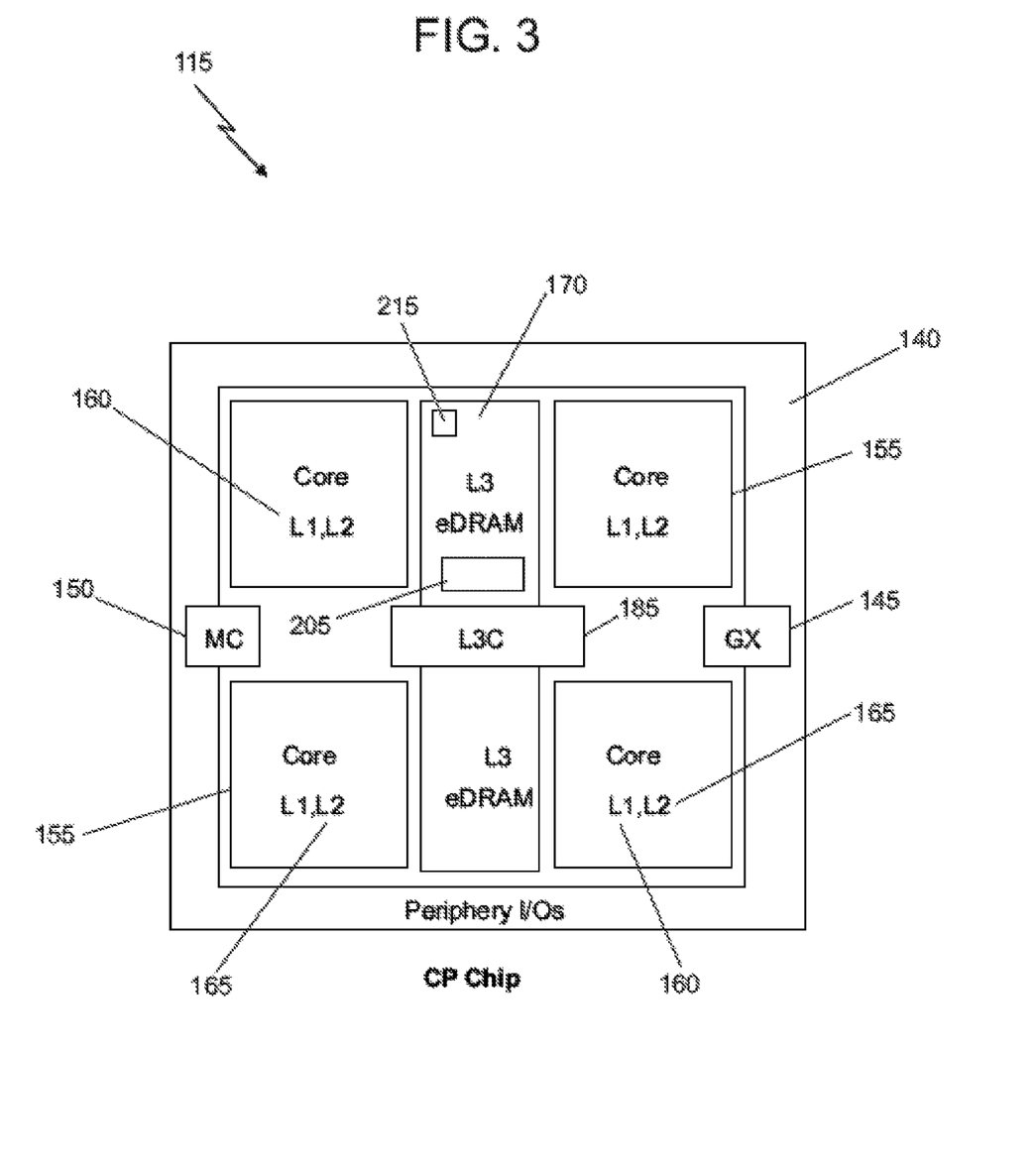
FIG. 3 depicts an exemplary embodiment of a processor of the data storage system of FIG. 2.
Figure 4:
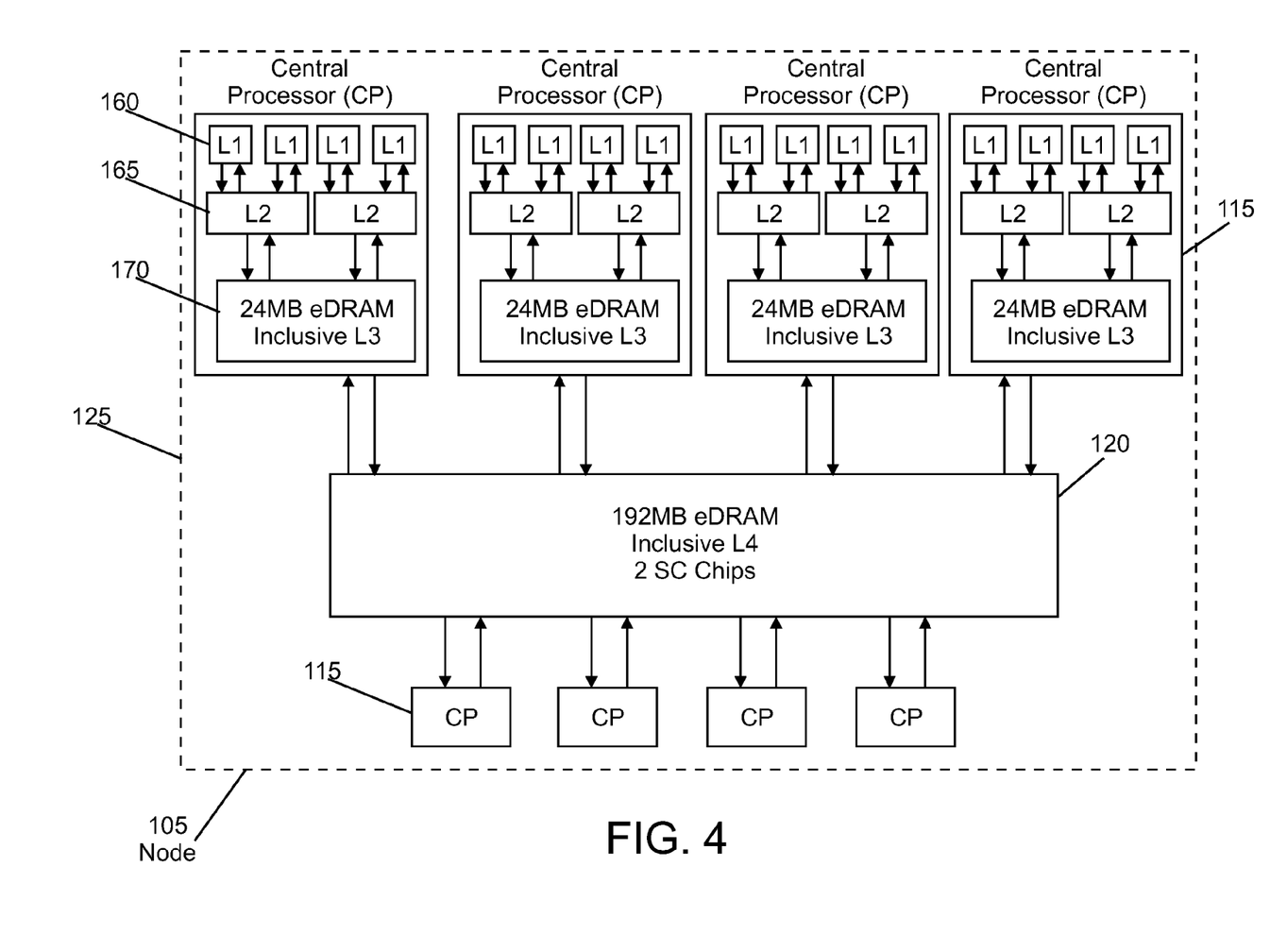
FIG. 4 depicts a block diagram showing components of the data storage system of FIG. 2.

Referring to in FIGS. 3 and 4, the CP 115 may include additional components to facilitate functions such as processing, communication and data transfer, such as I/O devices 140 which may include input devices (or peripherals) and/or output devices (or peripherals), an I/O port 145 and a memory controller unit 150. The I/O devices 140 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 140 also include components for communicating over various networks, such as the Internet or an intranet.

In one embodiment, each of the central processors (CP) 115 includes one or more cores 155 which perform the reading and executing of instructions. On each central processor (CP) 105, the cores 155 are operatively connected via busses to one or more level 1 (L1) caches 160, one or more level 2 (L2) caches 165, and at least one level 3 (L3) cache 170 as understood by one skilled in the art. The L1 caches 160 are physically closest to the cores 155, followed by the L2 caches 165, and then the L3 caches 170. In the example shown in FIG. 3, each individual central processor 115 is fabricated on its own separate chip which includes the L1 caches 160, the L2 caches 165, and the L3 caches 170, and the L4 caches 120 are fabricated on their own separate chips. Although the L3 caches 170 and the L4 caches 120 are shown as including embedded dynamic random access memory (DRAM), which is referred to as eDRAM, it is understood that any other types of suitable memory such as DRAM may be utilized.

Figure 5:
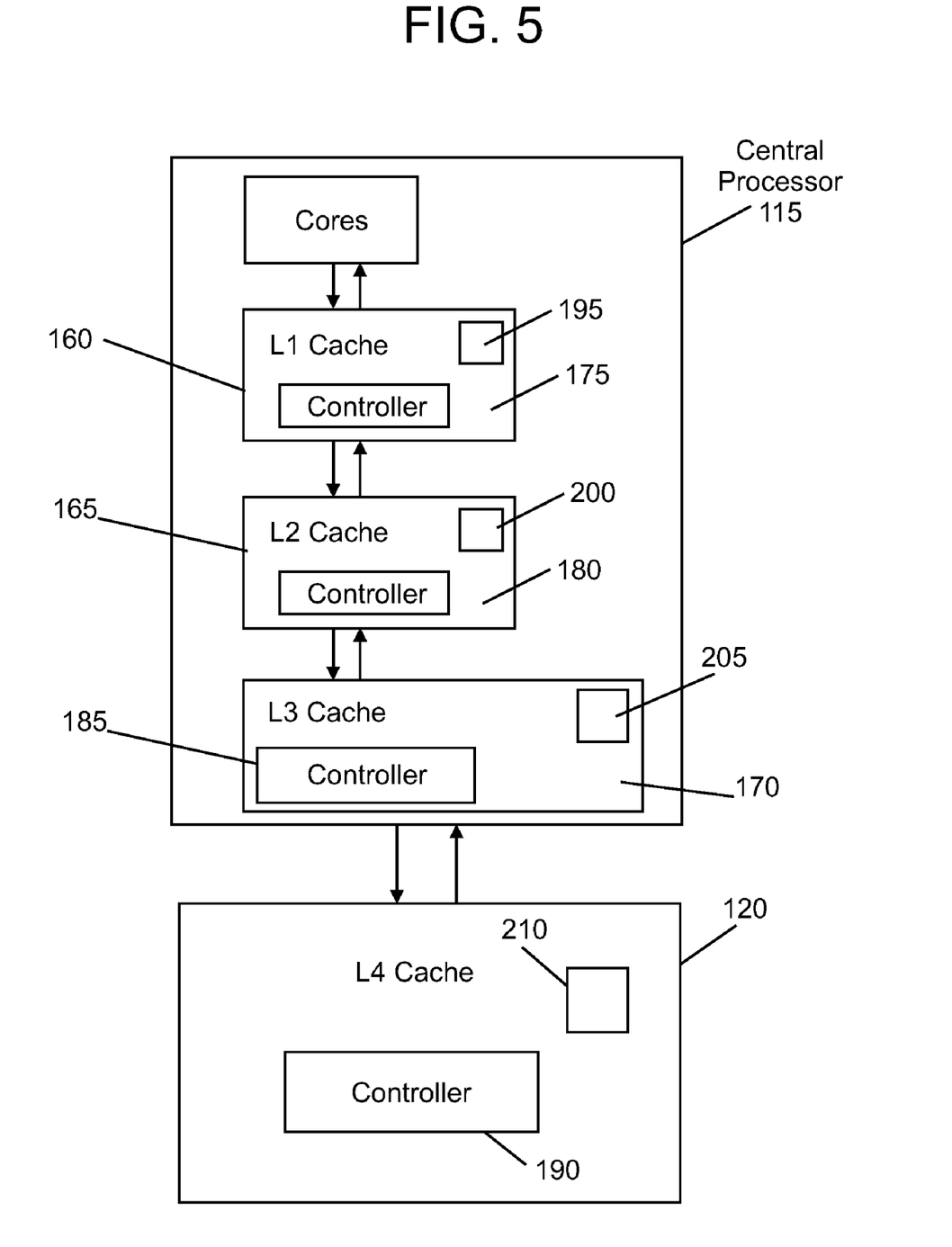
FIG. 5 depicts a block diagram showing components of the data storage system of FIG. 2.
Figure 6:
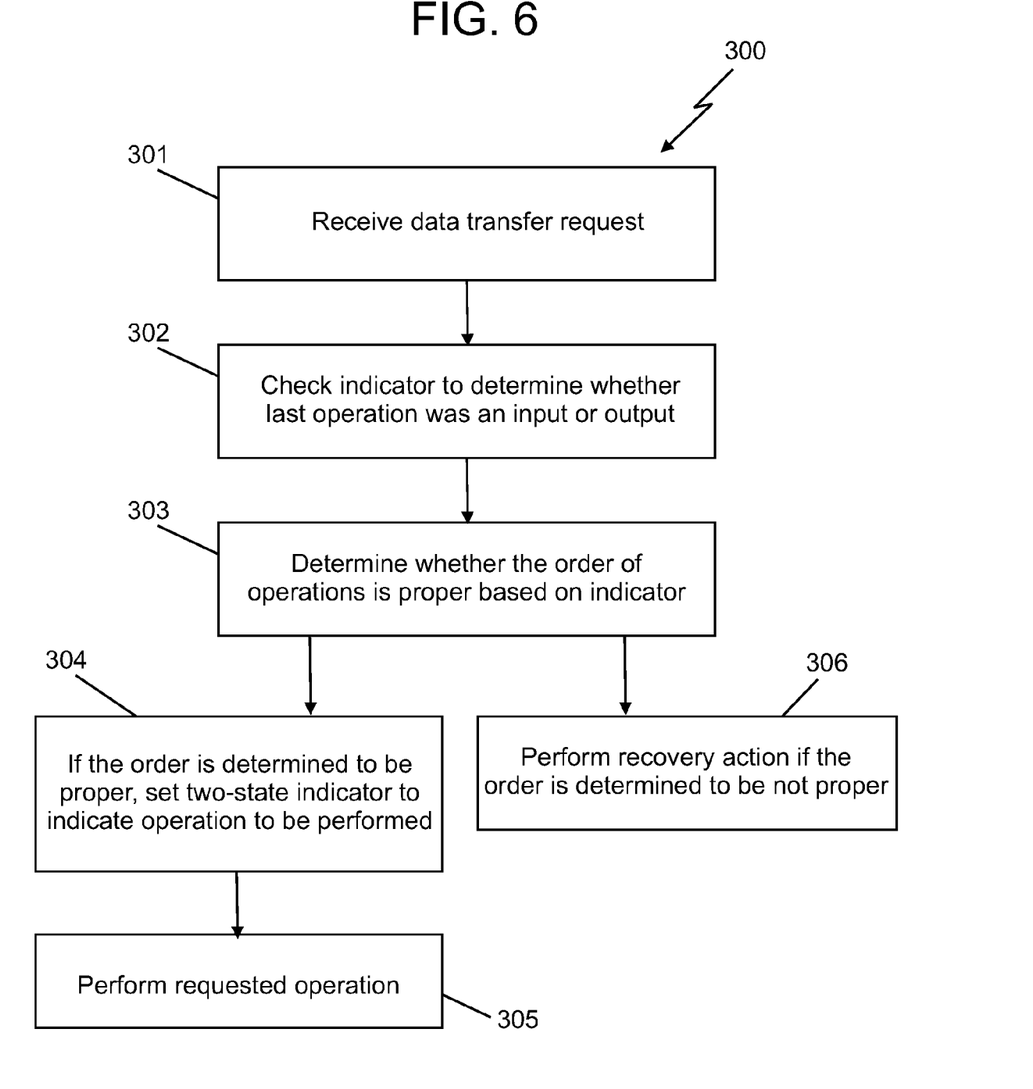
FIG. 6 depicts a flow diagram illustrating an exemplary embodiment of a method of managing a temporary memory.

Referring to FIG. 5, in one embodiment, one or more of the L1 caches 160, the L2 caches 165, the L3 cache 170 and the L4 caches 120 include their own respective cache controllers 175, 180, 185 and 190. In addition, one or more of the L1 caches 160, the L2 caches 165, the L3 cache 170 and the L4 caches 120 include or are otherwise associated with a respective dataflow buffer 195, 200, 205 and/or 210 that is configured as a pass-through for data being inputted and outputted from the caches. The buffers 195, 200, 205, 210 are configured to temporarily store data retrieved from another component or sent to another component, such as a cache or other memory area. Each buffer 195, 200, 205, 210 may be configured to be controlled by a respective cache controller 175, 180, 185 and 190, but is not limited thereto and may be controlled by any suitable controller, such as a buffer controller or logical controller instance. For example, the L3C controller 185 includes a controller instance dedicated to controlling the buffer 205 (i.e., a buffer controller) and another instance for controlling logic, addressing and other data management functions.

Referring again to FIG. 3, one or more components associated with a respective controller, such as the L3 cache 170, includes a two-state indicator 215 configured to identify the last or immediately preceding operation performed on the buffer. In one embodiment, the two-state indicator 215 is configured as a latch or other piece of circuitry in a cache (such as L3 cache 170) and/or a respective buffer (such as L3 buffer 205) that is configured to retain a value, but may be located at any desired location in the CP 115 or in any circuit-based controller, for example. Examples of suitable latches include set/re-set latches and data latches. The latch may be a multivibrator or other stable two-state system, but is not limited thereto. Although the indicator 215 is described as a latch herein, it is not so limited and may be any physical or logical switch or device configured to be able to be set between two states (e.g., on/off, read/write).

In one embodiment, the indicator 215 can be set to a first state or position (e.g., "on" or "1") that indicates that the previous or last operation on a buffer or other temporary memory was a data input operation. The indicator can also be set or re-set to a second state or position (e.g., "off" or "0") that indicates that the previous or last operation on the buffer was a data output operation. In one embodiment, the indicator 215 is generated or associated with the controller closest to the buffer, but may be associated with or reside with any desired controller or processor. In one embodiment, the latch or other indicator 215 includes two settings: a "read" setting indicating that the last operation performed on the buffer was a read operation (i.e., data was read out of the buffer), and a "write" setting indicating that the last operation performed on the buffer was a write operation (i.e., data was written into the buffer). In one embodiment, the indicator 215 is a "has-been-written" or "write" latch which may be set to the first or "on" position when a write request is received by the controller. If the write request is successfully performed, the latch is set to the "on" position. If the write request is canceled, the "write" latch is re-set or set to the second or "off" position.

FIG. 5 illustrates a method 300 of managing a cache or other temporary memory. The method 300 includes one or more stages 301-305. Although the method 300 is described in conjunction with the CP 115, the L3C controller 185 and a latch 215, the method 300 can be utilized in conjunction with any of the components and caches described herein, as well as with any device or system that utilizes dataflow buffers or other temporary memory devices configured to relay data between other components. In addition, although input and output operations described in conjunction with the method 300 include read and write operations, the input and output operations are not limited thereto.

In the first stage 301, the L3C controller 185 receives a data transfer request, i.e., a request to transfer data sent from a source location, such as a node, cache, processing unit or other component or remote device, to a destination location, such as the L3 cache 170. The data transfer request may be associated with an input or output operation to be performed on an intermediate temporary memory such as a buffer. In order to complete the request, the sent data may need to be transferred via a buffer such as the L3 buffer 205. For example, if a component associated with a destination location requests data from the cache 170, the requested data is written into or otherwise inputted into the buffer 205, and then should be read out of or otherwise outputted from the buffer 205 and sent to the destination.

In order to ensure the integrity of the system, the order of input and output operations on them buffer 205 should be maintained. For example, data that has been written into the buffer 205 should be read out of the buffer 205 before new data is written, so that the data is not overwritten and potentially lost. Ensuring that the data in the buffer 205 has been read will ensure that the data has been transferred to some location and is not lost when new data is written into the buffer 205.

In the second stage 302, the controller 185 checks the latch 215 (or other two-state indicator) to determine whether the immediately preceding operation on the buffer 205 was an input (e.g., write) or output (e.g., read) operation. For example, the latch 215 has a first or set position indicating that the last operation was a write operation and a second or not-set position indicating that the last operation was a read operation.

In the third stage 303, the controller 185 determines whether the requested operation can be completed by confirming whether the order of the last operation and the operation is correct. If the requested operation is a read operation and the latch 215 is at the set position indicating that the last operation was a write operation, the controller 185 determines that the order of operations is proper. Likewise, if the requested operation is a write operation and the latch 215 is at the not-set position indicating that the last operation was a read operation, the controller 185 determines that the order of operations is proper.

In the fourth stage 304, if the order of operations is determined to be proper, the controller 185 confirms that the operation should not be cancelled due to external reasons. If the operation is to be processed, the controller 185 updates the indicator, for example, by either setting the latch to the first position if the operation is a write or sets the latch to the second position if the operation is a read.

In the fifth stage, the controller 185 completes the requested read or write operation on the buffer 205.

In the sixth stage 306, if the controller 185 determines that the order of operations is not proper, then the controller 185 may perform a recovery action. Examples of a recovery action may include any response to the order being improper, such as canceling the requested operation, sending a warning, putting the operation on hold and/or retrying the operation after some period of time. In one embodiment, the controller 185 sends an alarm, warning or other message to the requesting entity, a system controller or other component in the system, and corrective action may be taken.

In one embodiment, the buffer is a queued buffer such as a First-In-First-Out (FIFO) buffer. In this embodiment, the latch 215 is configured to indicate the last immediately preceding operation on the data item that is at the head of the queue in the buffer. The controller 185 need not wait until all data in an operation is written into the buffer 205 before performing a read on data already written into the queue, and conversely can write data into the buffer 205 before reading all the data for an operation.

In one embodiment, a controller associated with a respective cache, memory area, or other component configured to receive data, is configured to generate an identifier configured to identify data inputted into the buffer or other temporary memory as a result of an input operation. The identifier may be an unique identifier assigned to the data and retrieved from metadata or other control data, or may be an identifier based on multiplexing data, for example. For example, if a controller writes data into a buffer, the controller may save an identifier and retrieve that identifier when checking the latch again. This may prove useful in allowing the controller to identify the data requested in a read operation and matching that data to the identifier to ensure that the correct data is being read out.

Dataflow refers to a data stream, frame, packet, signal, one or more frames associated with one or more selected operations. Although the buffers described herein include dataflow buffers configured for read and write operations, they are not limited thereto.

Figure 7:
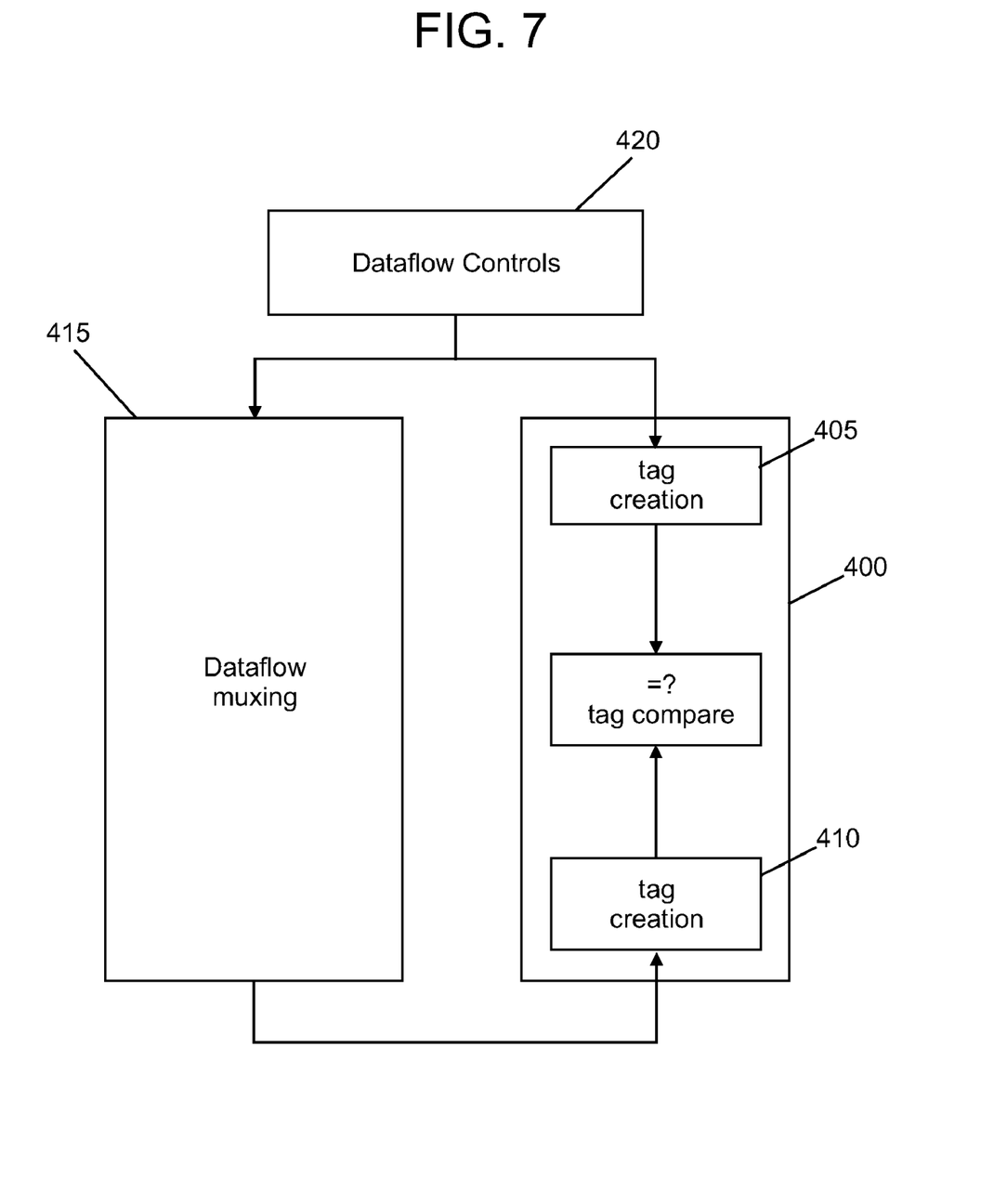
FIG. 7 depicts an exemplary embodiment of a method of error checking received data.

Referring to FIG. 7, one or more of the controllers or other components are configured to perform an error checking method to ensure that data received at a destination is the data that was sent from a source. In one example, a controller such as the controller 185 includes error checking logic 400 that is configured to generate and compare tags 405, 410 to ensure that data arriving at a destination, such as the cache 170, came from the correct source.

For example, the controller 185 receives data, such as a data stream, block or frame, from a source such as another cache or node, from a source and stores the received data in a data stack or other suitable data structure or memory location in the cache 170. In this example, the received data is multiplexed data having a data multiplexing or "muxing" structure 415.

The error checking logic collects control data such as address or other data sent from the source via dataflow controls 420 and generates a first source tag 405 indicating the data source. In one embodiment, the cache 170 receives a data item and places the data item in a stack or other area, and error checking logic 400 in the controller 185 collects the control data from each item and generates the first tag 405 indicating a source for each item.

The data destination, such as the cache 170, receives an indication through the data muxing structure 415 of the data source, and provides this to the error checking logic 405. The error checking logic translates this into a second source tag 410. The error checking logic 400 then compares the first and second tags to ensure that the data arriving at the destination came from the correct source.

The systems and methods described herein provide numerous advantages over prior art dataflow systems. Technical effects and benefits include the provision of a simple and inexpensive way to certify that the order of operations in a dataflow buffer is being upheld in the buffer. The checks indicate if the dataflow is set on an incorrect sequence, thereby ensuring that data that is being read is the correct data, and that data in the buffer prior to a write operation has been previously read so that no data is lost. This provides a simple and efficient way to allow the system to self-correct and ensure system integrity is being upheld.

Advantages of generating and comparing source tags as described herein include a simple effective way to error check data stacks or other data flows by confirming the source of the data and, for example, ensuring that dataflows are properly multiplexed. Use of a tag also reduces the chip area needed for error checking by reducing the amount of control logic relative to splitting techniques, which required two sets of control logic for the dataflow. The reduced logic also provides power savings relative to prior art techniques.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of managing a memory, the method comprising:
    receiving a request from a processing unit to transfer data from a source location to a destination location, the data transfer request associated with an operation to be performed on an intermediate memory configured to temporarily hold data that is being transferred from the source location to the destination location, the operation selected from an input into the intermediate memory and an output from the intermediate memory;
    checking, by a controller unit, a two-state indicator associated with the intermediate memory, the two-state indicator having a first state indicating that an immediately preceding operation on the intermediate memory was an input to the intermediate memory and a second state indicating that the immediately preceding operation was an output from the intermediate memory;
    determining, by the controller unit, whether the operation is received in a correct order relative to the immediately preceding operation, the operation being in the correct order based on one of:
        the operation being an input operation and the two-state indicator being in the second state, indicating that the immediately preceding operation was an output; and
        the operation being an output operation and the two-state indicator being in the first state, indicating that the immediately preceding operation was an input; and
    performing, by the controller unit, the operation based on a determination that the operation is received in the correct order, wherein performing includes any one of:
        setting the two-state indicator to the first state based on the operation being an input operation; and
        setting the two-state indicator to the second state based on the operation being an output operation.

2. The method of claim 1, further comprising:
    setting the two-state indicator to the first state prior to performing the input operation; and
    setting the two-state indicator to the second state prior to performing the output operation.

3. The method of claim 1, further comprising performing a recovery action based on one of:
    the operation being an input operation and the two-state indicator being in the first state, indicating that the immediately prior operation was an input; and
    the operation being an output operation and the two-state indicator being in the second state, indicating that the immediately prior operation was an output.

4. The method of claim 1, further comprising generating an identifier, the identifier configured to identify data inputted into the intermediate memory as a result of the input operation.

5. The method of claim 1, wherein the two-state indicator is a latch.

6. The method of claim 1, wherein the intermediate memory is a buffer.

7. The method of claim 6, wherein the buffer is associated with a cache.

8. A device for managing a memory, the device comprising:
    an intermediate memory for inputting data received from a source location and outputting data to a destination location;
    a controller functionally coupled to the intermediate memory, the controller configured to execute computer-executable instructions and configured to perform:
    receiving a request to transfer data from a source location to a destination location, the data transfer request associated with an operation to be performed, the operation selected from an input into the intermediate memory and an output from the intermediate memory;
    checking a two-state indicator associated with the intermediate memory, the two-state indicator having a first state indicating that an immediately preceding operation on the intermediate memory was an input to the intermediate memory and a second state indicating that the immediately preceding operation was an output from the intermediate memory;
    determining whether the operation is received in a correct order relative to the immediately preceding operation, the operation being in the correct order based on one of:
        the operation being an input operation and the two-state indicator being in the second state, indicating that the immediately preceding operation was an output; and
        the operation being an output operation and the two-state indicator being in the first state, indicating that the immediately preceding operation was an input; and performing the operation based on a determination that the operation is received in the correct order, wherein performing includes any one of:
  setting the two-state indicator to be the first state based on the operation being an
  setting the two-state indicator to the second state based on the operation being an output operation.

9. The device of claim 8, wherein the processor is configured to further perform:
  setting the two-state indicator to the first state based on performing the input operation; and
  setting the two-state indicator to the second state based on performing the output operation.

10. The device of claim 8, wherein the processor is configured to further perform canceling the operation based on one of:
  the operation being an input operation and the two-state indicator being in the first state, indicating that the immediately prior operation was an input; and
  the operation being an output operation and the two-state indicator being in the second state, indicating that the immediately prior operation was an output;
  wherein the two-state indicator is a latch.

11. The device of claim 8, wherein the two-state indicator is a latch.

12. The device of claim 11, wherein the latch is selected from a set-reset latch and a data latch.

13. The device of claim 8, wherein the intermediate memory is a buffer.

14. The device of claim 13, wherein the buffer is associated with a cache.

15. The device of claim 13, wherein the buffer is disposed in at least one of a central processor, a level 1 cache, a level 2 cache, a level 3 cache and a level 4 cache, as part of a data storage unit.

16. A computer program product for managing a memory, comprising a tangible storage medium readable by a processing circuit and storing instructions for execution by the processing circuit for performing a method comprising:
  receiving a request to transfer data from a source location to a destination location, the data transfer request associated with an operation to be performed, the operation selected from an input into an intermediate memory and an output from the intermediate memory;
  checking a two-state indicator associated with the intermediate memory, the two-state indicator having a first state indicating that an immediately preceding operation on the intermediate memory was an input to the intermediate memory and a second state indicating that the immediately preceding operation was an output from the intermediate memory;
  determining whether the operation is received in a correct order relative to the immediately preceding operation, the operation being in the correct order based on one of:
    the operation being an input operation and the two-state indicator being in the second state, indicating that the immediately preceding operation was an output; and
    the operation being an output operation and the two-state indicator being in the first state, indicating that the immediately preceding operation was an input; and
  performing the operation based on a determination that the operation is received in the correct order, wherein performing includes any one of:
    setting the two-state indicator to the first state based on the operation being an input operation; and
    setting the two-state indicator to the second state based on the operation being an output operation.

17. The computer program product of claim 16, wherein the method further comprises:
  setting the two-state indicator to the first state based on performing the input operation; and
  setting the two-state indicator to the second state based on performing the output operation.

18. The computer program product of claim 16, wherein the method further comprises canceling the operation based on one of:
  the operation being an input operation and the two-state indicator being in the first state, indicating that the immediately prior operation was an input; and
  the operation being an output operation and the two-state indicator being in the second state, indicating that the immediately prior operation was an output.

19. The computer program product of claim 16, wherein the two-state indicator is a latch.

20. The computer program product of claim 16, wherein the intermediate memory is a buffer.

* * * * *